US010043098B2

(12) United States Patent
Hong et al.

(10) Patent No.: US 10,043,098 B2
(45) Date of Patent: Aug. 7, 2018

(54) METHOD OF DETECTING COLOR OBJECT BY USING NOISE AND SYSTEM FOR DETECTING LIGHT EMITTING APPARATUS BY USING NOISE

(71) Applicant: RESEARCH & BUSINESS FOUNDATION SUNGKYUNKWAN UNIVERSITY, Suwon-si (KR)

(72) Inventors: Kwang-Seok Hong, Gwacheon-si (KR); Byung-Hun Oh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 56 days.

(21) Appl. No.: 15/378,802

(22) Filed: Dec. 14, 2016

(65) Prior Publication Data

US 2017/0177971 A1    Jun. 22, 2017

(30) Foreign Application Priority Data

Dec. 17, 2015    (KR) .................. 10-2015-0180876

(51) Int. Cl.
| | |
|---|---|
| *G06K 9/00* | (2006.01) |
| *G06K 9/46* | (2006.01) |
| *G06T 7/90* | (2017.01) |
| *G06T 5/00* | (2006.01) |
| *G06T 7/11* | (2017.01) |
| *G06T 7/136* | (2017.01) |

(52) U.S. Cl.
CPC ............ *G06K 9/4652* (2013.01); *G06T 5/002* (2013.01); *G06T 7/11* (2017.01); *G06T 7/136* (2017.01); *G06T 7/90* (2017.01); *G06T 2207/10024* (2013.01)

(58) Field of Classification Search
CPC ......... G06K 9/4652; G06T 5/002; G06T 7/90; G06T 7/11; G06T 7/136; G06T 2207/10024
USPC .................................................. 382/162, 167
See application file for complete search history.

(56) References Cited

U.S. PATENT DOCUMENTS

| | | | | |
|---|---|---|---|---|
| 2006/0092440 A1* | 5/2006 | Bagai | ...................... | G06T 5/002 358/1.9 |
| 2016/0203589 A1* | 7/2016 | Dzyubak | ................. | G06T 5/002 382/131 |

* cited by examiner

*Primary Examiner* — Daniel Mariam
(74) *Attorney, Agent, or Firm* — NSIP Law

(57) ABSTRACT

A system for detecting a light emitting apparatus, the system including a light emitting apparatus for emitting a color, a camera configured to obtain a source image that includes a target object having the color, a memory apparatus storing software configured to detect the target object by generating a noise image by adding an additive color to the source image, detecting objects in a YCbCgCr image and an HSV image with respect to the noise image by using respective threshold values of the YCbCgCr image and the HSV image, and combining the YCbCgCr image and the HSV image in which the objects have been detected, and a control circuit configured to detect the target object in the source image by using the software.

15 Claims, 12 Drawing Sheets

METHOD OF DETECTING COLOR OBJECT BY USING NOISE AND SYSTEM FOR DETECTING LIGHT EMITTING APPARATUS BY USING NOISE

CROSS-REFERENCE TO RELATED APPLICATION

This application claims the benefit under 35 USC 119(a) of Korean Patent Application No. 10-2015-0180876 filed on Dec. 17, 2015, in the Korean Intellectual Property Office, the entire disclosure of which is incorporated herein by reference for all purposes.

BACKGROUND

1. Field

The following description relates to a technology for detecting a color object in an image.

2. Discussion of Related Art

Methods of detecting an object in a digital image are used in various fields of applications, such as an intelligent transportation system (ITS), a surveillance camera, and interactions between an object to be detected and a computer. Also, the method of detecting an object in an image may be utilized for an interaction technique using a recognized object.

Meanwhile, an image processing algorithm for detecting an object in an image by using colors mainly uses feature information that is represented by three-dimensional color information of R(red), G(green), and B(blue). The main reason color information is used is that color information provides more information than a gray image or binary image, and enables easy extraction of data and fast image processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of detecting a color object by using noise. The method includes generating, by an image processing apparatus, a noise image by adding an additive color to a source image that includes a color object; converting, by the image processing apparatus, an RGB image with respect to the noise image into a YCbCgCr image; converting, by the image processing apparatus, the RGB image with respect to the noise image into a hue, saturation, and value (HSV) image; detecting, by the image processing apparatus, a first object in the YCbCgCr image based on a threshold value, and a second object in the HSV image based on a threshold value; and detecting, by the image processing apparatus, the color object by combining an image in which the first object is detected with an image in which the second object is detected.

In another general aspect, there is provided a system for detecting a light emitting apparatus by using noise, the system including a light emitting apparatus, a camera, a memory apparatus, and a control circuit. The light emitting apparatus may be configured to emit a color. The camera may be configured to obtain a source image that includes a target object having the color. The memory apparatus may store software. The software may be configured to detect the target object by generating a noise image by adding an additive color to the source image, detecting objects in a YCbCgCr image and an HSV image with respect to the noise image by using respective threshold values of the YCbCgCr image and the HSV image, and combining the YCbCgCr image and the HSV image in which the objects have been detected. The control circuit may be configured to detect the target object in the source image by using the software.

Figure 1:
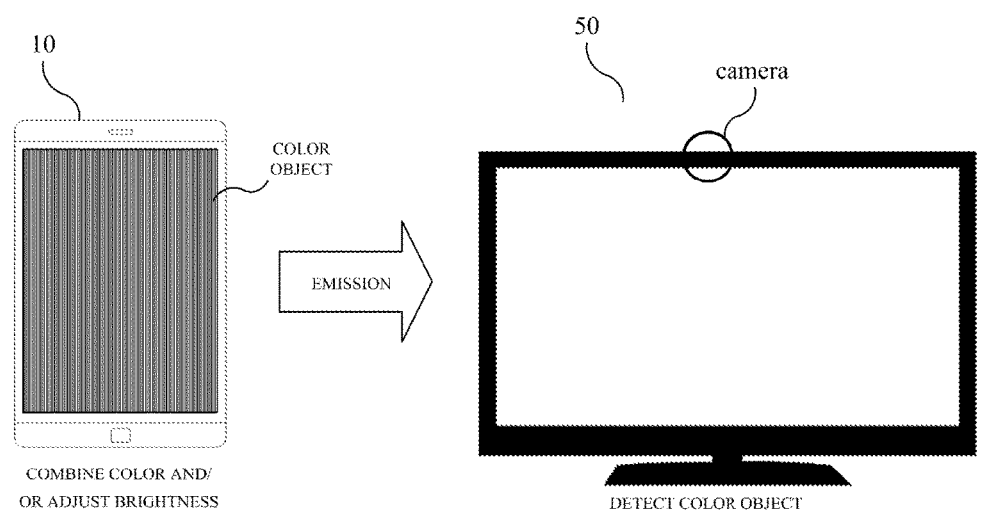
FIG. 1 illustrates an example of a light emitting apparatus for emitting a color and an image processing apparatus for detecting a color.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The technology described below relates to a method for detecting a particular color object in a digital image. As described above, the method of detecting an object in an image is used in various fields of application. For example, in order to recognize an object, such as a face, a region corresponding to a face (or skin) needs to be detected first. Also, in order to use an interface command of a hand movement or finger movement of a human, a region corresponding to a hand or finger of a human needs to be detected first in an image obtained by a camera.

The technology described below may rapidly detect an object in an image by using a relatively simple and cheap apparatus, such as a camera embedded in a smart phone, a camera embedded in a smart television, or a camera connected to a computer (web cam). Also, the following technology provides an object detecting method with low complexity, and thus is useful for detecting a plurality of objects in the same image. The following technology has a primary feature in that both of an HSV model and a YCbCgCr model generated by adding G(green) chrominance information to a conventional YCbCr color model are used, and another primary feature in that a color object is detected by adding a predetermined color (noise) to an original image. Hereinafter, an apparatus for detecting a color object by processing an input image is referred to as an image processing apparatus.

The image processing apparatus may detect a color object having a particular color in an input image. The image processing apparatus may detect an apparatus for emitting a predetermined color by using a camera. Another primary feature of the technology described below includes allowing the apparatus for emitting a predetermined color to adjust a color or brightness of the color that is emitted by itself according to the surrounding environment or performance of the camera so as to facilitate the color detection.

FIG. 1 illustrates an example of a light emitting apparatus for emitting a color and an image processing apparatus for detecting a color. In FIG. 1, a light emitting apparatus 10 and an image processing apparatus 50 are illustrated. In FIG. 1, a light emitting apparatus 10 is illustrated as a smart phone. In FIG. 1, an image processing apparatus 50 is illustrated as a smart TV. The light emitting apparatus 10 outputs a color object on a liquid crystal screen of the light emitting apparatus 10. The color object represents a color object. The image processing apparatus 50 obtains an image that includes the light emitting apparatus 10 by using a camera, and detects the color object in the image.

The technology described below has two primary features: (i) a color combination and/or a brightness adjustment of a liquid crystal in the light emitting apparatus 10; and (ii) noise addition in the image processing apparatus 50. That is, the light emitting apparatus 10 may combine R, G, B colors and/or adjust brightness of a liquid crystal such that a color object to be detected becomes robust to change in a surrounding environment, and the image processing apparatus 50, when a color image is input from a camera, may add noise to the image to make an emitting color become distinct so that the color object is easily detected.

The light emitting apparatus 10 emits a predetermined color. The color of a color object in an image obtained by the image processing apparatus 50 may vary depending on the ambient illuminance. Also, the color obtained by the image processing apparatus 50 may be different from a color originally output by the light emitting apparatus 10 depending on the performance of the image processing apparatus 50 or camera. In this case, the image processing apparatus 50 may perform an additional image processing, such as color calibration. Also, the light emitting apparatus 10 may actively change the color being output by the light emitting apparatus 10 into a color having a different value in consideration of the surrounding environment (illuminance) or the performance of the camera. Also, the light emitting apparatus 10 may adjust a brightness value of the color being output by the light emitting apparatus 10 in consideration of the surrounding environment.

FIG. 2A to 2D illustrate an example of a light emitting apparatus which emits a predetermined color. FIG. 2A to 2D show an example of screens that are output from a light emitting apparatus, such as a smart phone and an example of source images obtained through a camera by the image processing apparatus.

Figure 2A:
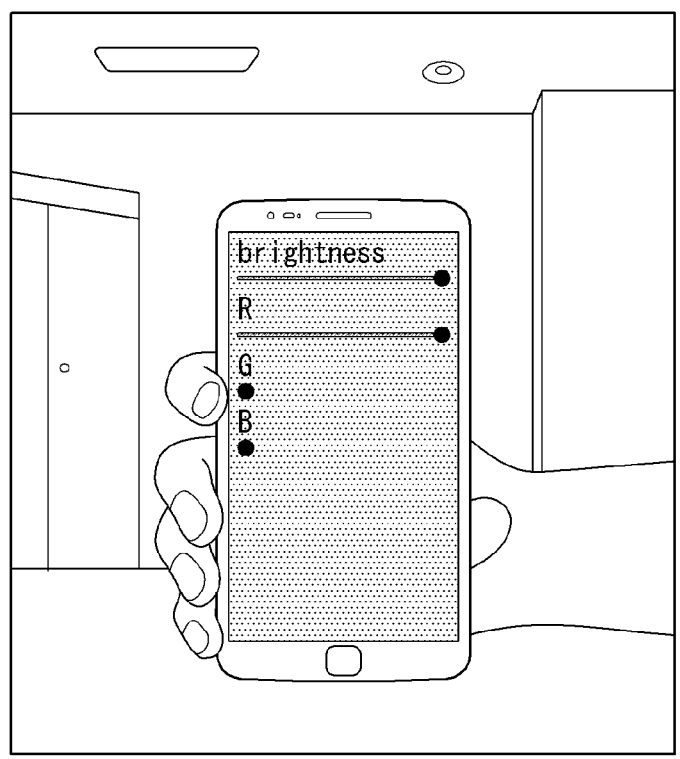
FIG. 2A to 2D illustrate an example of a light emitting apparatus which emits a predetermined color.

FIG. 2A is an image that is obtained by capturing an image being output on a display panel of the light emitting apparatus with a camera. The image shown in FIG. 2A has a color corresponding to a color of an image originally output (intended) by the light emitting apparatus. In FIG. 2A, the light emitting apparatus outputs a color (Red) of R: 255, G: 0, B: 0. In FIG. 2A, the light emitting apparatus outputs an example of a color at the greatest brightness. For example, when a brightness of a screen ranges 0 to 100, FIG. 2A shows an example in which the light emitting apparatus outputs a color having a brightness of 100.

Figure 2B:
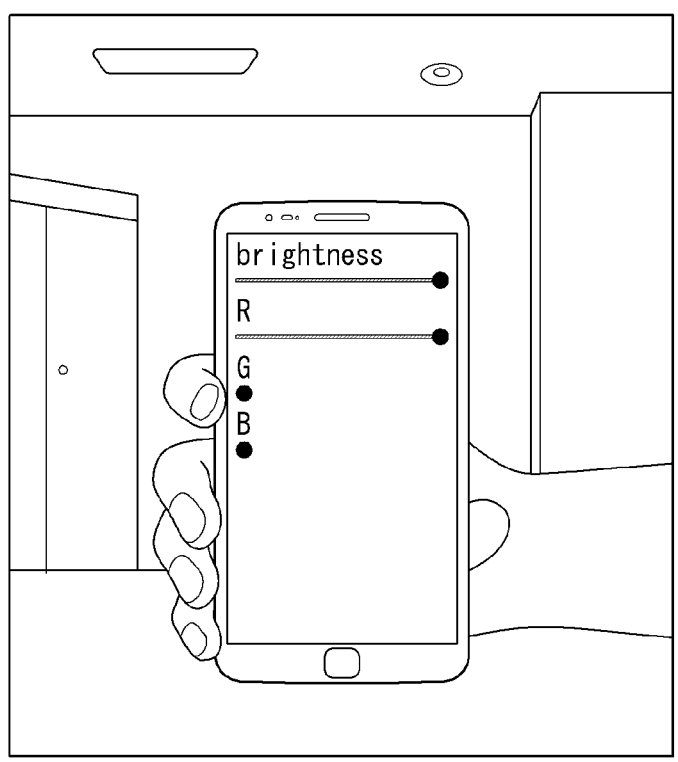

FIG. 2B shows an example in which the light emitting apparatus outputs the same color with the same brightness as in FIG. 2A. FIG. 2B shows an example of less exposure in a camera lens compared to FIG. 2A. FIG. 2B has a background darker than that of FIG. 2A and a display panel brighter in color than that of FIG. 2A. In this case, the image processing apparatus has difficulty in recognizing a color that is originally intended by the light emitting apparatus, and depending on the situation, fails to detect a color object included in the image. Also, when the light emitting apparatus has a low ambient illuminance, the image processing apparatus may obtain an image similar to that shown in FIG. 2B.

Figure 2C:
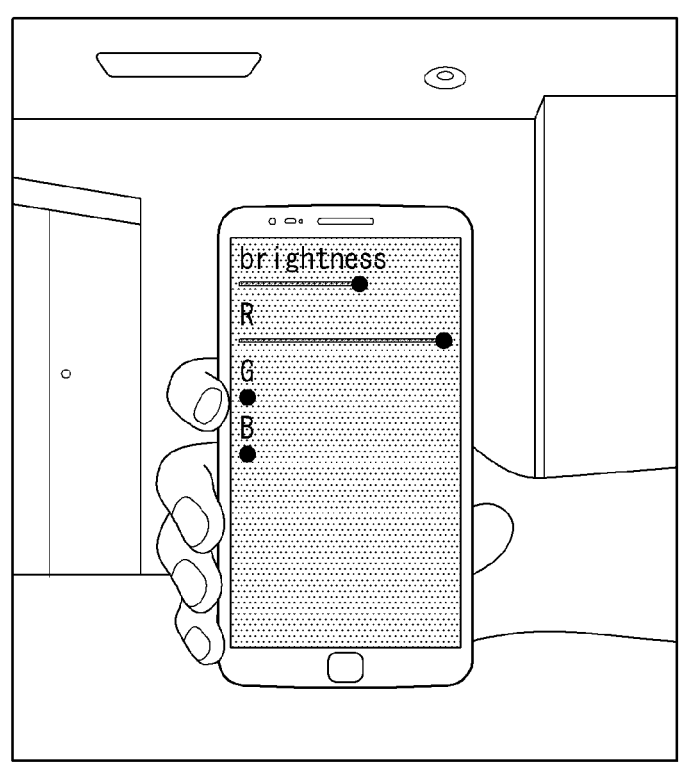

In order to convey a color value that is originally intended by the light emitting apparatus in the environment of FIG. 2B, the light emitting apparatus may adjust a brightness value of the color. FIG. 2C shows an example in which the image emitting apparatus has adjusted the brightness of the screen. For example, FIG. 2C is an example in which the light emitting apparatus adjusts a screen brightness to be lowered to 67 from 100. In FIG. 2C, it can be seen that the image processing apparatus has obtained the color originally output by the light emitting apparatus.

Figure 2D:
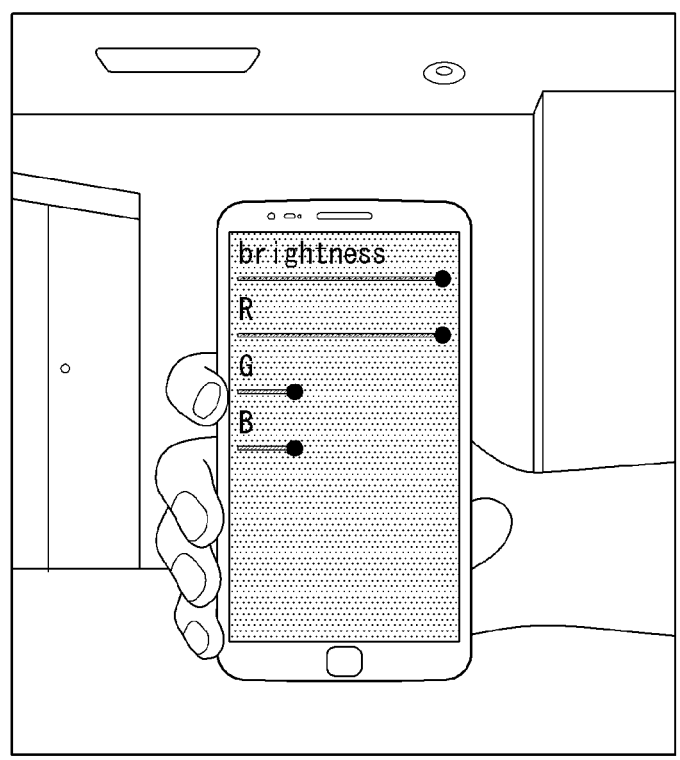

Meanwhile, in order to convey a color value that is originally intended by the light emitting apparatus in the environment of FIG. 2B, the light emitting apparatus may adjust a color value. FIG. 2D shows an example in which the image emitting apparatus has adjusted the color value being output on the screen. FIG. 2D has R, G, B color values adjusted with the screen brightness maintained at 100. For example, the light emitting apparatus may output a color having a value of R: 255, G: 30, B: 33. That is, the light emitting apparatus may increase G and B values to output a slightly darker color in its entirety. In FIG. 2D, it can be seen that the image processing apparatus has obtained the color originally output by the light emitting apparatus.

In order for the light emitting apparatus to uniformly adjust the brightness or color of the screen, the light emitting apparatus needs to obtain in advance information about a surrounding environment, such as illumination, or the degree of exposure of a lens. Alternatively, the light emitting apparatus may adjust the brightness or color of the screen by receiving predetermined feedback from the image processing apparatus.

Figure 3:
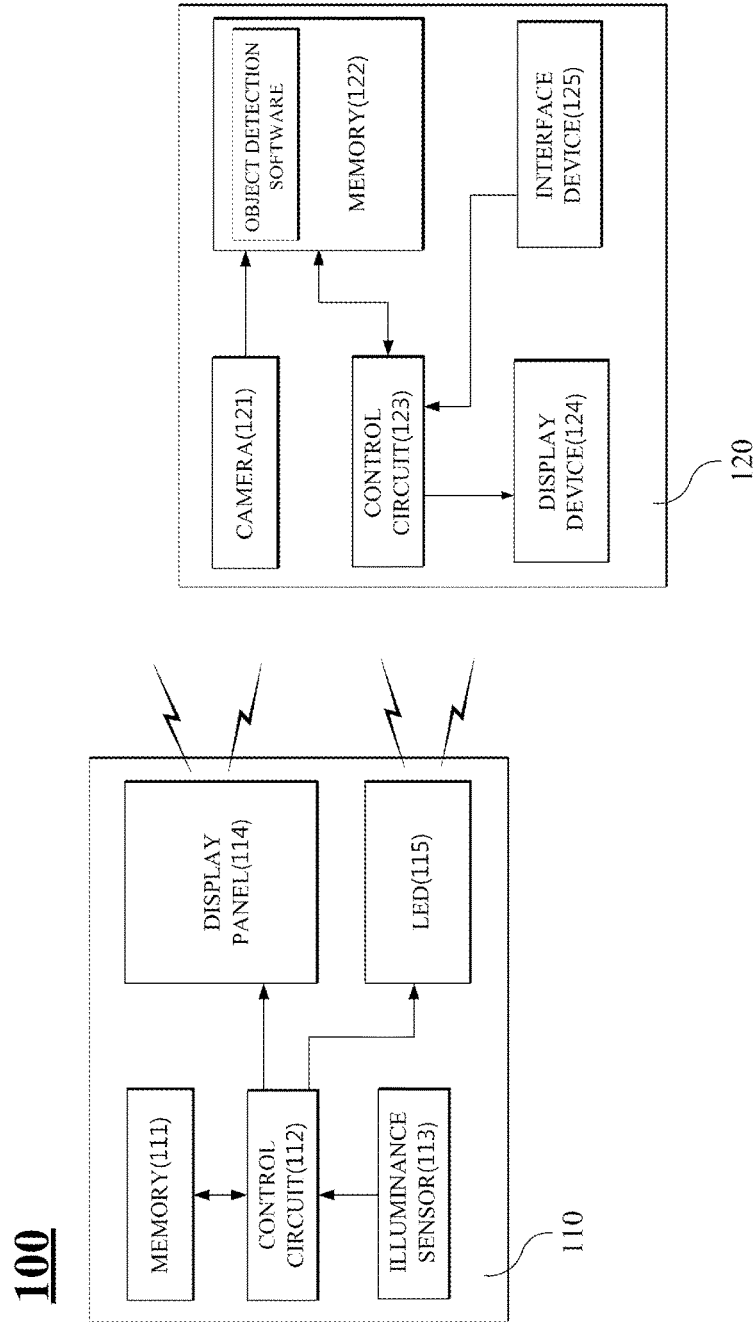
FIG. 3 illustrates a block diagram of an example of a system for detecting a light emitting apparatus.

FIG. 3 illustrates a block diagram of an example of a system for detecting a light emitting apparatus 100. The system for detecting the light emitting apparatus 100 includes a light emitting apparatus 110 for emitting a predetermined color and an image processing apparatus 120 for detecting a color (a color object) that is emitted by the light emitting apparatus 110.

First, the light emitting apparatus 110 is illustrated. A memory 111 stores information about a color emitted by the light emitting apparatus 110. When the light emitting apparatus 110 is configured to emit a single color, the memory 111 may not be needed. In FIG. 3, the light emitting apparatus 110 includes a display panel 114 and a light emitting diode (LED) 115. The light emitting apparatus 110 may include either the display panel 114 or the LED 115. Further, the light emitting apparatus 110 may include another device for emitting a color. A control circuit 112 controls the display panel 114 or the LED 115 to emit a predetermined color by referring to the information stored in the memory 111.

As described above, the light emitting apparatus 110 may adjust a color or brightness emitted by the light emitting apparatus 110 in consideration of the performance of a camera 121 of the image processing apparatus 120 or the surrounding environment (e.g. illuminance). An illuminance sensor 113 measures illuminance at a place in which the light emitting apparatus 110 is positioned. The control circuit 112 searches for a brightness value or color combination value of the screen that corresponds to the illuminance in a table stored in the memory by referring to the measured illuminance. The control circuit 112 may control the display panel 114 or the LED 115 to emit a predetermined color by using the brightness value or color combination value that is found in the table. Information about an exposure value of the lens may be obtained by the light emitting apparatus 110 in advance, or may be obtained from the image processing apparatus 120 by a network configuration that is not shown in FIG. 3. In this case, also, the control circuit 112 may find suitable values in a table that stores exposure values of the lens and brightness values (or color combination values).

Referring to FIG. 3, the image processing apparatus 120 obtains a source image that includes the light emitting apparatus 110 emitting a predetermined color, by using the camera 121. The memory 122 stores object detection software for executing a color object detecting method.

A control circuit 123 generates a noise image by adding an additive color to the source image by using the object detection software, detects objects in a YCbCgCr image and an HSV image with respect to the noise image by using respective threshold values, and detects a target object by combining the YCbCgCr image and the HSV image in which the objects have been detected.

The control circuit 123 detects a first object by extracting an object exceeding a threshold value from a chrominance channel of Cb, a chrominance channel of Cg, and a chrominance channel of Cr of the YCbCgCr image, and performing binarization on an image from which the object equal to or greater than the threshold value has been extracted by using object detection software. The control circuit 123 detects a second object by extracting a pixel equal to or greater than a first threshold value and a pixel equal to or less than a second threshold value from a S channel of the HSV image and extracting a pixel equal to or greater than a third threshold value from a V channel of the HSV image, and combining an image extracted from the S channel with an image extracted from the V channel by using object detection software. The control circuit 123 finally detects a target object by combining an image in which the first object has been detected with an image in which the second object has been detected. The color object detecting method will be described in detail below.

Two or more light emitting apparatus 110 may be used simultaneously. In this case, a plurality of light emitting apparatuses may emit colors different from each other. The image processing apparatus 120 may simultaneously detect the plurality of light emitting apparatuses, and recognize the detected plurality of light emitting apparatuses as different inputs. Also, the image processing apparatus 120 may simultaneously detect the plurality of light emitting apparatuses, and recognize the detected plurality of light emitting apparatuses as a combined single input.

The image processing apparatus 120 may include a display device 124 configured to output predetermined information or a predetermined image. For example, the display device 124 may be a monitor of a computer apparatus, a display device of a smartphone, a display device of a smart television or the like. Also, the image processing apparatus 120 may include an interface device 125 configured to receive a predetermined command from a user. For example, the interface device 125 may be an input device of a computer apparatus, a touch panel of a smartphone, a remote controller of a smart television or the like.

The system for detecting the light emitting apparatus 100 may have various examples of utilization: (1) in an image processing apparatus, such as a smart television, a user may input a predetermined interface command by using a remote controller that emits light. For example, a user may replay image content by making a round figure with a remote controller that emits a red color. Also, a user may select a television channel by drawing a predetermined number in the air with a remote controller that emits light; and (2) in an image processing apparatus, such as a game console, a user may input a command used for a game by using a game controller that emits light.

Figure 4:
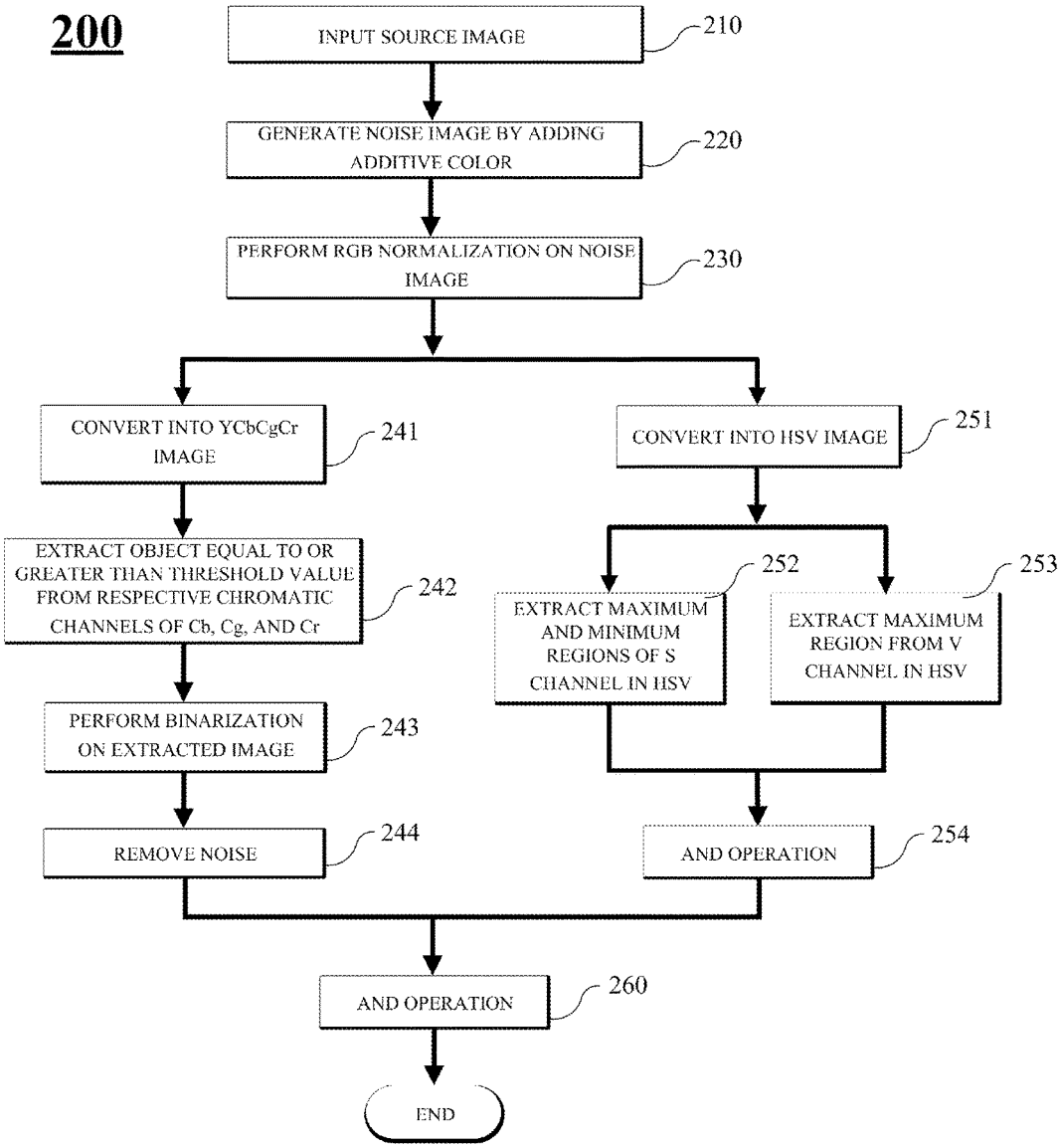
FIG. 4 illustrates a flowchart of an example of a method of detecting a color object by using noise.

Hereinafter, a method of detecting a color object in the image processing apparatus will be described. FIG. 4 illustrates a flowchart of an example of a method of detecting a color object by using noise (200).

First, the image processing apparatus receives a source image (210). The image processing apparatus may use a source image that is pre-stored in storage media, a source image that is transmitted via a network, or a source image that is obtained through a camera in real time.

The source image refers to an original image that includes a color object to be detected. Hereinafter, the color object to be detected is referred to as a target object. The image processing apparatus refers to an apparatus for detecting a target object in a source image.

The image processing apparatus generates a noise image by adding noise to the source image (220). Noise refers to a color that is artificially added to the source image by the image processing apparatus. The image processing apparatus may add noise having a color different from that of a target object that is desired to be detected. The image processing apparatus may use information about the color of a target object that is obtained in advance. The noise image refers to an image obtained by adding noise to the source image. The noise addition will be described in detail below with reference to FIGS. 5A to 5D.

The image processing apparatus may perform RGB normalization on the noise image (230). A color image is composed of a RGB model, and a general RGB color model is sensitive to illuminance change, thus having limitation in precise calculation. Accordingly, the image processing apparatus performs normalization, in which r, g, and b component values of a source image or a noise image each are divided by a summation of the r, g, and b component values. The normalization process is expressed by Equation 1 as shown below.

$$R = \frac{r}{(r+g+b)}, G = \frac{g}{(r+g+b)}, B = \frac{b}{(r+g+b)} \quad \text{[Equation 1]}$$

In Equation 1, R, G, and B respectively refer to R, G, and B component values that have been subjected to normalization.

The image processing apparatus converts the RGB image into a YCbCgCr image and an HSV image, and detects objects in the YCbCgCr image and the HSV image, respectively. The image processing apparatus detects a first object in a YCbCgCr image and a second object in an HSV image.

A process of detecting the first object in the YCbCgCr image corresponds to the operations 241 to 244 in FIG. 4. Hereinafter, the process of detecting the first object will be described.

The image processing apparatus converts a RGB color image into a YCbCgCr image (241). The YCbCgCr image refers to a YCbCgCr model obtained by adding green (G) chrominance information to a YCbCr color model.

A process of extracting chrominance information Cb, Cg, and Cr for each of B (blue), G(green), and R (red) from a RGB color model, except for the brightness component (Y), is expressed by Equations 2 to 4 as described below.

$$Cb = -0.16874*R - 0.33126*G + 0.50000*B \quad \text{[Equation 2]}$$

$$Cg = G - (B + ((R-B) \gg 1)) \quad \text{[Equation 3]}$$

$$Cr = 0.50000*R - 0.41869*G - 0.08131*B \quad \text{[Equation 4]}$$

In Equations 2 to 4, R, G, and B refer to component values for r(red), g(green), and b(blue), respectively, in the RGB color model.

The image processing apparatus may extract a pixel equal to or greater than a predetermined threshold value (a pixel having a dark color) from each chrominance channel of Cb, Cg, and Cr extracted from Equations 2 to 4 (242). For example, a pixel having a color equal to or greater than 150 may be extracted and used. A setting of the threshold value may be changed in consideration of various environment factors, such as the performance of the image processing apparatus, image information of an object desired to be detected, illuminance in which an image is obtained, and so on. A threshold value used in the YCbCgCr image may be referred to as a YCbCgCr threshold value. The YCbCgCr threshold value may employ different values for respective chrominance channels.

In addition, the image processing apparatus may extract a maximum value of chrominance information corresponding to a particular one of the Cb, Cg, and Cr chrominance channels. For example, when chrominance information about a target object desired to be extracted is known, only a particular channel in which the corresponding object is more effectively detected may be used.

Then, the image processing apparatus may perform binarization on the YCbCgCr image to detect the first object in the YCbCgCr image (243). Through the binarization, the object of the image may be simplified, and the efficiency of object detection may be enhanced.

Once a corresponding color is detected in the respective chrominance channels through the threshold value (242), the image processing apparatus may distinguish the detected color as a Region of Object, and perform binarization on the Region of Object relative to the background. The binarization process may be expressed by Equation 5 as shown below.

$$\text{Region of Objcet} = \begin{cases} 255 & \text{If } (\alpha \geq Cb \| Cg \| Cr) \\ 0 & \text{Otherwise} \end{cases} \quad \text{[Equation 5]}$$

Region of Object refers to a region in which a particular object is positioned in an image. α refers to a threshold value for binarization. That is, when chrominance information extracted for each of Cg, Cg, and Cr is equal to or greater than α, a value of 225 (black) is given, and when chrominance information extracted for each of Cg, Cg, and Cr is less than α, a value of 0 (white) is given. The threshold value α for binarization is different from the YCbCgCr threshold value that has been used to extract Cb, Cg, and Cr.

The image processing apparatus may detect the first object by performing binarization on and then combining the images of the Cb, Cg, and Cr chrominance channels. In addition, the image processing apparatus may detect the first object by performing binarization only on an image in which the object is clearly detected among images of the Cb, Cg, and Cr chrominance channels.

The image processing apparatus may remove noise from the image which has been subjected to the binarization (244). For example, the image processing apparatus may perform dilation as expressed by Equation 6, and/or perform erosion as expressed by Equation 7.

$$A \oplus B = \bigcup_{W \in B} A_W = (a, b) + (u, v) : (a, b) \in A, (u, v) \in B \quad \text{[Equation 6]}$$

The dilation operation, assuming that A and B are sets of pixels, A⊕B is defined by Equation 6. The dilation operation is used to fill an empty space (e.g. a hole), which may be formed in a material or background, or to connect parts that are cut at short intervals, by decreasing a protrusion inside an object and increasing a protrusion outside the object. In the binary image, dilation does not cause changes to a region having uniform input pixels, but is performed on a region in which black and white pixels are present.

$$A \ominus B = w : B_w \subseteq A \quad \text{[Equation 7]}$$

The erosion operation, assuming that A and B are sets of pixels, A⊖B is defined by Equation 7. $B_w$ is a result of shifting a morpheme B, and a set w=(u,v) which is completely included in the set A refers to a result of the dilation. The erosion operation finds a locus in which B is completed inside A while shifting B on A, and gathers points corresponding to an origin of each locus to remove noise.

The process of detecting the second object in the HSV image corresponds to the operations 251 to 254 in FIG. 4. Hereinafter, the process of detecting the second object will be described.

The image processing apparatus converts a RGB color image into an HSV image (251). The method of converting a RGB image into an HSV image may be implemented in various methods. In FIG. 1, the image processing apparatus may use only a saturation (S) channel and a value (Value) channel excluding a hue (H) channel that is sensitive to lighting in the process of detecting the second object. Depending on the situation, information about the H channel may be used as well.

The image processing apparatus extracts a maximum region and a minimum region of the S channel in the HSV (252). The image processing apparatus extracts a pixel equal to or greater than a first threshold value and a pixel equal to or less than a second threshold value from the S channel. The first and second threshold values used in the S channel are referred to as S channel threshold values. The image processing apparatus extracts a maximum region equal to or greater than a predetermined reference threshold value from the V channel (253). The threshold value used in the V channel is referred to as a V channel threshold value. The S channel threshold values and the V channel threshold value may vary according to various factors of an environment in which an object is detected. For example, the image processing apparatus may use 205 as the first threshold value of the S channel, 35 as the second threshold value of the S channel, and 190 as the threshold value of the V channel.

The image processing apparatus combines an image extracted from the S channel with an image extracted from the V channel (254). The image processing apparatus performs an AND operation on the image extracted from the S channel and the image extracted from the V channel, thereby detecting the second object.

Finally, the image processing apparatus combines (AND) the image in which the first object has been detected in the YCbCgCr image with the image (mask image) in which the second object has been detected in the HSV image (260). The image processing apparatus finally detects the target object by combining the image in which the first object has been detected with the image in which the second object has been detected.

Figure 5A:
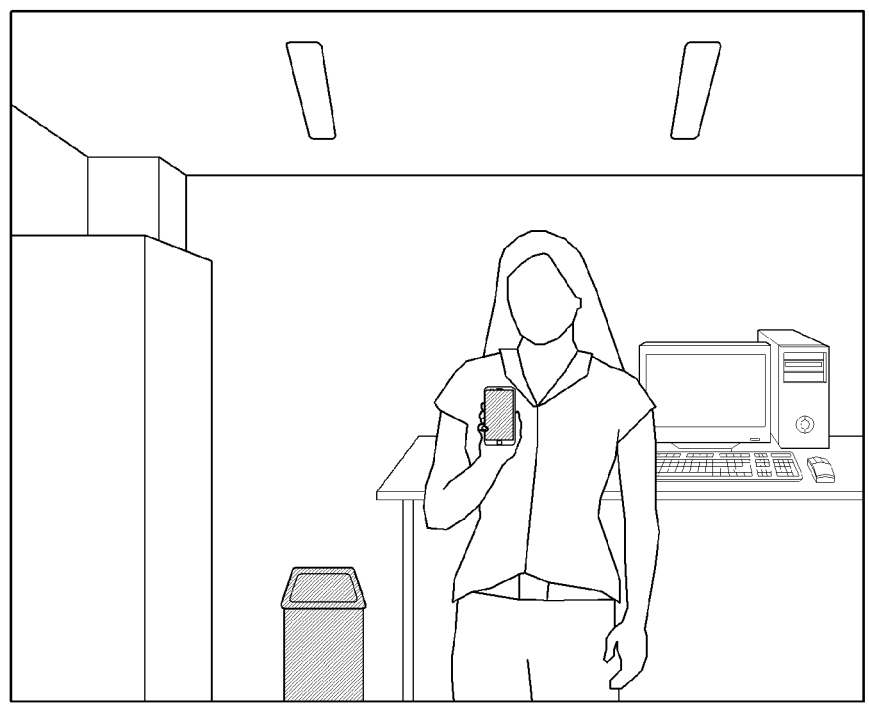
FIG. 5A to 5D illustrate an example of a binary image of an original image and a binary image of the original image to which noise has been added.
Figure 5B:
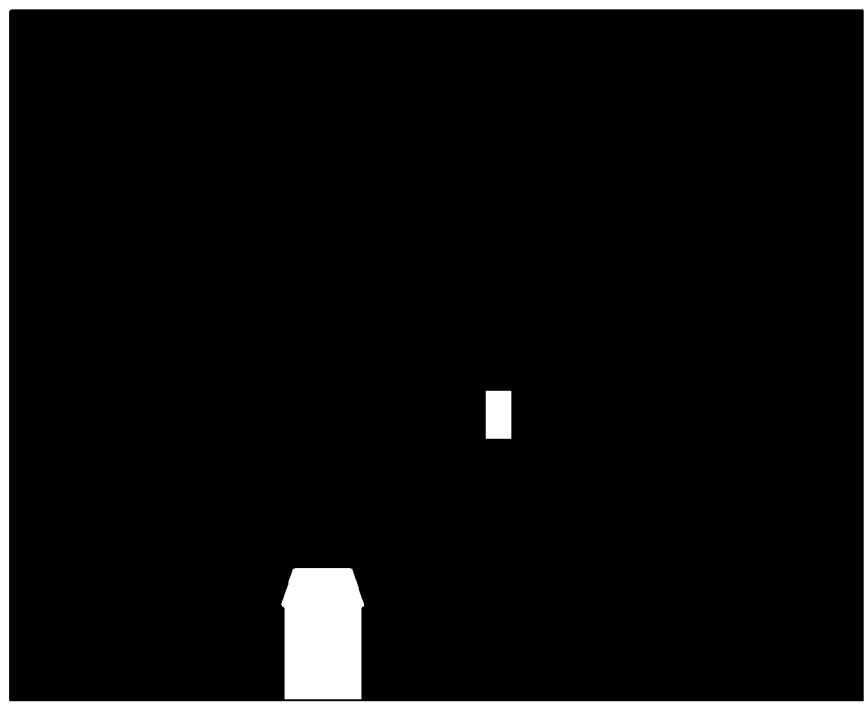
Figure 5C:
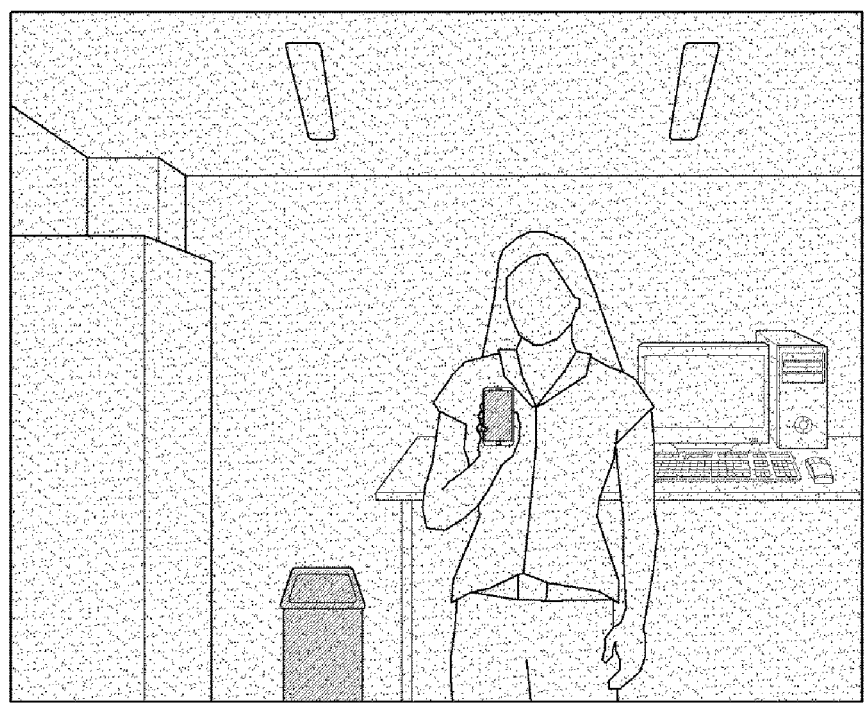

FIG. 5A to 5D illustrate an example of a binary image of an original image and a binary image of the original image to which noise has been added. FIG. 5A to 5D illustrate images each including a color object that emits blue. FIG. 5A is an original image including a color object, and FIG. 5C is an example of a noise image obtained by adding a predetermined color to the original image.

Referring to FIG. 5A, a user holds a blue color object (a smart phone that emits light) that is an object to be detected in the original image by the user. In FIG. 5A, the color object held by the user is indicated with a solid line in red. Referring to FIG. 5A, a recycle bin having a blue-based color is positioned at a lower side of the color object. The recycle bin has a color slightly different from that of the color object to be detected. In FIG. 5A, the recycle bin is also indicated with a solid line colored in red. It should be understood that the bold solid lines in FIGS. 5A and C are additionally provided for the sake of convenience in description, rather than being included in the original image.

FIG. 5B is an example in which the original image has been subjected to binarization, as pre-processing to detect the color object in the original image of FIG. 5A. For example, FIG. 5B may represent a result of detecting the color object in the original image of FIG. 5A by omitting the noise adding process in the color object detecting method described with reference to FIG. 4. Referring to FIG. 5B, it can be seen that the color object and the recycle bin having a blue-based color are detected in the original image. That is, the image processing apparatus detects another object as well as a target object desired to be detected.

FIG. 5C is an example of a noise image obtained by adding a predetermined color to the original image. FIG. 5C is an example in which noise is mixed by adding 20 to a color value (red) and 20 to a color value (green) and not adding to the color (blue) of the color object that is desired to be detected by the image processing apparatus.

Figure 5D:
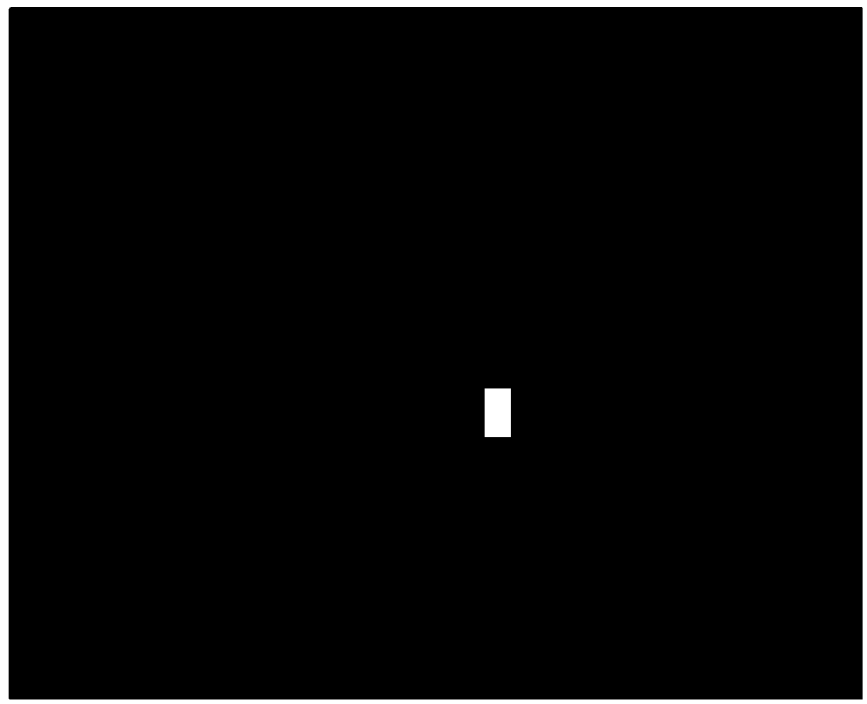

FIG. 5D is an example in which the color object detecting method described with reference to FIG. 1 is applied to the noise image shown in FIG. 5C. Referring to FIG. 5D, it is seen that only the color object (a target object) desired to be detected is detected. That is, the image processing apparatus mixes predetermined noise with the original image and detects the color object, so that only the target object is precisely detected without detecting the recycle bin. As described above, the noise may be set depending on the color value of an object desired to be detected. Also, the color value of the noise may vary depending on the circumstances, such as ambient illuminance.

Figure 6:
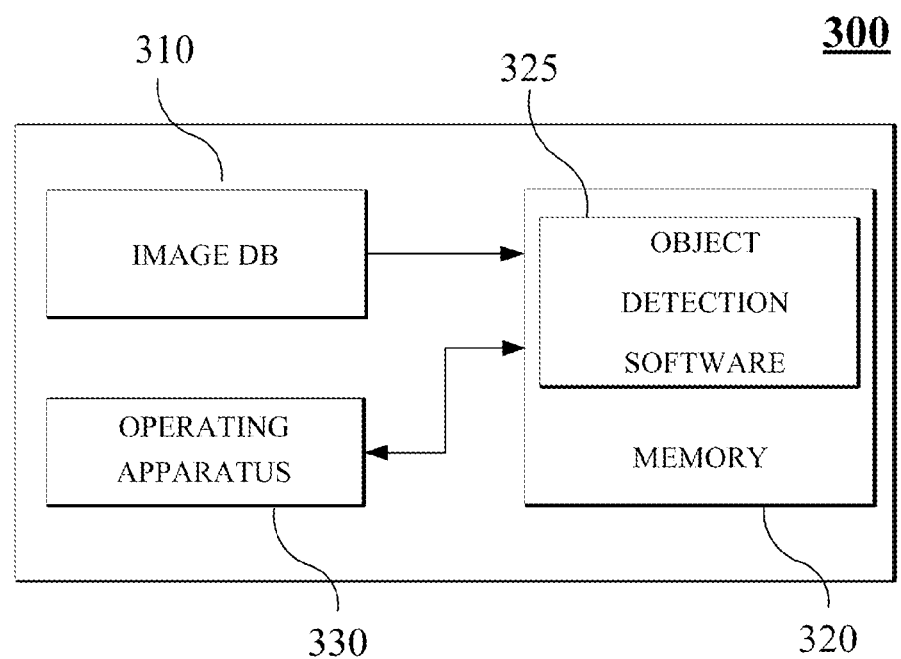
FIG. 6 illustrates a block diagram of an example of an image processing apparatus for detecting a color object by using noise.

FIG. 6 illustrates a block diagram of an example of an image processing apparatus for detecting a color object by using noise. The image processing apparatus is an apparatus that detects a target object in a source image. The image processing apparatus includes an apparatus for processing a predetermined image, for example, a personal computer (PC), a smartphone, a smart television, and so on. Also, the image processing apparatus may include a server connected to a network. The image processing apparatus may detect a color object by driving a program for detecting an object when the image processing apparatus is a computer apparatus, such as a PC. When the computer apparatus drives the program for detecting an object, software for detecting an object is loaded on a memory, and an operating apparatus (central processing unit: CPU) detects a color object by using the software. The image processing apparatus implemented as a smartphone may detect a color object by driving an application for detecting an object. In this case, when the smart phone drives the application, software (code) for detecting an object is loaded on a memory, and an operating apparatus (application processor: AP) detects a color object by using the software. Also, when the image processing apparatus is an exclusively dedicated apparatus for detecting a color object, the image processing apparatus may include a chipset in which object detection software is embedded.

FIG. 6 shows an example of the image processing apparatus 300 including a memory 320 and an operating apparatus 330. An image database (DB) 310 is a component configured to store a source image. The image DB 310 corresponds to a storage medium, such as a hard disk and a flash memory. According to embodiments, the image DB 310 may be a DB server located in a remote area while being connected via a network. The memory 320 stores the object detection software 325 for detecting a color object. The object detection software 325 is provided to execute the method of detecting a color object by using noise which has been described with reference to FIG. 4. The operating apparatus 330 detects a particular color object that is included in a source image by driving the object detection software 325 stored in the memory 320.

In brief, the operating apparatus 330 detects a target object by generating a noise image by adding an additive color to a source image, detecting objects by using respective threshold values of a YCbCgCr image and an HSV image with respect to the noise image, and combining the YCbCgCr image and the HSV image in which the objects have been detected, by using the object detection software 325. Detailed operation of the operating apparatus 330 has been described with reference to FIG. 4.

As is apparent from the above, a color object can be effectively detected by adding noise to a source image. The above-described technology can provide various apparatuses and systems that adopt a color emitting apparatus as an interface.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting a color object by using noise, the method comprising:
    generating, by an image processing apparatus, a noise image by adding an additive color to a source image that includes a color object;
    converting, by the image processing apparatus, an RGB image with respect to the noise image into a YCbCgCr image;
    converting, by the image processing apparatus, the RGB image with respect to the noise image into a hue, saturation, and value (HSV) image;
    detecting, by the image processing apparatus, a first object in the YCbCgCr image based on a threshold value, and a second object in the HSV image based on a threshold value; and
    detecting, by the image processing apparatus, the color object by combining an image in which the first object is detected with an image in which the second object is detected.

2. The method of claim 1, wherein the additive color includes at least one color different from a color of the color object.

3. The method of claim 1, wherein the image processing apparatus generates the noise image by adding, to the source image, a plurality of colors each having a magnitude of a reference value.

4. The method of claim 1, wherein the detecting of the first object in the YCbCgCr image comprises:
    extracting an object equal to or greater than a threshold value from a chrominance channel of Cb, a chrominance channel of Cg, and a chrominance channel of Cr of the YCbCgCr image;
    performing binarization on an image from which the object equal to or greater than the threshold value has been extracted; and
    when the image having being subjected to the binarization is plural, combining the plurality of images having being subjected to the binarization.

5. The method of claim 1, wherein the converting of the RGB image into the YCbCgCr image comprises extracting, by the image processing apparatus, blue chrominance information Cb, green chrominance information Cg, and red chrominance information Cr from the RGB image as expressed by the following:

$$Cb=-0.16874*R-0.33126*G+0.50000*B,$$

$$Cg=G-(B+((R-B)\gg 1),$$

$$Cr=0.50000*R-0.41869*G-0.08131*B.$$

6. The method of claim 1, further comprising, by the image processing apparatus, performing RGB normalization on the noise image.

7. The method of claim 1, wherein the detecting of the second object in the HSV image comprises:
    extracting a pixel equal to or greater than a first threshold value and a pixel equal to or less than a second threshold value from a S channel of the HSV image;
    extracting a pixel equal to or greater than a third threshold value from a V channel of the HSV image; and
    combining an image extracted from the S channel with an image extracted from the V channel.

8. A system for detecting a light emitting apparatus by using noise, the system comprising:
    a light emitting apparatus configured to emit a color;
    a camera configured to obtain a source image that includes a target object having the color;
    a memory apparatus which stores software configured to detect the target object by generating a noise image by adding an additive color to the source image, detecting objects in a YCbCgCr image and an HSV image with respect to the noise image by using respective threshold values of the YCbCgCr image and the HSV image, and combining the YCbCgCr image and the HSV image in which the objects have been detected; and
    a control circuit configured to detect the target object in the source image by using the software.

9. The system of claim 8, wherein the light emitting apparatus includes a plurality of interface apparatuses, and a plurality of light emitting apparatuses emit colors different from each other.

10. The system of claim 8, wherein the additive color includes at least one color different from a color of the light emitting apparatus.

11. The system of claim 8, wherein the additive color includes a plurality of colors each having a magnitude of a reference value.

12. The system of claim 8, wherein the light emitting apparatus emits the color that is a combination of red, green, and blue.

13. The system of claim 8, wherein the light emitting apparatus adjusts brightness of the color according to ambient illuminance.

14. The system of claim 8, wherein the control circuit is configured to detect the object by extracting an object equal to or greater than a threshold value from a chrominance channel of Cb, a chrominance channel of Cg, and a chrominance channel of Cr in the YCbCgCr image, and performing binarization on an image from which the object equal to or greater than the threshold value has been extracted by using the software.

15. The system of claim 8, wherein the control circuit is configured to detect the object by extracting a pixel equal to or greater than a first threshold value and a pixel equal to or less than a second threshold value from a S channel of the HSV image and extracting a pixel equal to or greater than a third threshold value from a V channel of the HSV image and combining an image extracted from the S channel with an image extracted from the V channel by using the software.

* * * * *